US011218841B2

United States Patent
Wang et al.

(10) Patent No.: US 11,218,841 B2
(45) Date of Patent: Jan. 4, 2022

(54) FAST QUERY METHOD FOR DYNAMIC LOCATION INFORMATION OF MOBILE NETWORK ENTITY

(71) Applicants: INSTITUTE OF ACOUSTICS, CHINESE ACADEMY OF SCIENCES, Beijing (CN); BEIJING HILI TECHNOLOGY CO. LTD, Beijing (CN)

(72) Inventors: Jinlin Wang, Beijing (CN); Jun Chen, Beijing (CN); Gang Cheng, Beijing (CN); Xiaozhou Ye, Beijing (CN); Haojiang Deng, Beijing (CN); Lingfang Wang, Beijing (CN); Weining Qi, Beijing (CN)

(73) Assignees: INSTITUTE OF ACOUSTICS, CHINESE ACADEMY OF SCIENCES, Beijing (CN); BEIJING HILI TECHNOLOGY CO. LTD, Beijing (CN)

( * ) Notice: Subject to any disclaimer, the term of this patent is extended or adjusted under 35 U.S.C. 154(b) by 5 days.

(21) Appl. No.: 16/757,038

(22) PCT Filed: Dec. 21, 2017

(86) PCT No.: PCT/CN2017/117697
§ 371 (c)(1),
(2) Date: Apr. 17, 2020

(87) PCT Pub. No.: WO2019/085225
PCT Pub. Date: May 9, 2019

(65) Prior Publication Data
US 2020/0367019 A1    Nov. 19, 2020

(30) Foreign Application Priority Data
Oct. 30, 2017    (CN) .......................... 201711038593.0

(51) Int. Cl.
*H04W 4/029* (2018.01)
*H04W 64/00* (2009.01)
(Continued)

(52) U.S. Cl.
CPC ............. *H04W 4/029* (2018.02); *H04W 8/22* (2013.01); *H04W 60/00* (2013.01); *H04W 64/006* (2013.01)

(58) Field of Classification Search
CPC ....... H04W 4/02–029; H04W 8/00–28; H04W 48/04; H04W 60/005–04;
(Continued)

(56) References Cited

U.S. PATENT DOCUMENTS 6,553,231 B1 * 4/2003 Karlsson ............... H04W 36/18
370/331
9,521,592 B2   12/2016 Qu et al.
(Continued)

FOREIGN PATENT DOCUMENTS

CN    1925669 A    3/2007
CN    101854664 A    10/2010
(Continued)

OTHER PUBLICATIONS

Jul. 31, 2018 Search Report issued in International Patent Application No. PCT/CN2017/117697.

*Primary Examiner* — San Htun
(74) *Attorney, Agent, or Firm* — Oliff PLC

(57) ABSTRACT

A fast query method for a mobile network entity dynamic location information, using a distributed container hierarchical nested structure to process registration and queries for location information, includes: after a network entity connects to a network attachment point after moving and obtains a new network address assignment, determining a series of a registered container, and then registering new
(Continued)

location information corresponding to where the network entity is currently located, the location information containing at least current network address information; when a network forwarding device learns that the network entity is currently un-reachable, querying the new location information of the network entity from the container where the network entity was located before moving; and the container where the network entity was located before moving, after receiving the query request, obtains the new location information of the network entity by searching in the container and in a peer neighboring container set.

7 Claims, 1 Drawing Sheet

(51) Int. Cl.
*H04W 8/22* (2009.01)
*H04W 60/00* (2009.01)

(58) Field of Classification Search
CPC ... H04W 64/00–006; H04W 88/00–06; H04W 92/00–04; H04W 92/08; H04W 92/16; H04W 92/18

See application file for complete search history.

(56) References Cited

U.S. PATENT DOCUMENTS

| | | | |
|---|---|---|---|
| 2010/0061308 A1* | 3/2010 | Becker | H04W 60/04 370/328 |
| 2011/0201354 A1* | 8/2011 | Park | H04W 68/04 455/456.1 |
| 2013/0308470 A1* | 11/2013 | Bevan | H04W 36/32 370/252 |
| 2015/0215823 A1 | 7/2015 | Qu et al. | |

FOREIGN PATENT DOCUMENTS

| | | |
|---|---|---|
| CN | 104093124 A | 10/2014 |
| CN | 104541541 A | 4/2015 |
| WO | 2010/091716 A1 | 8/2010 |

* cited by examiner

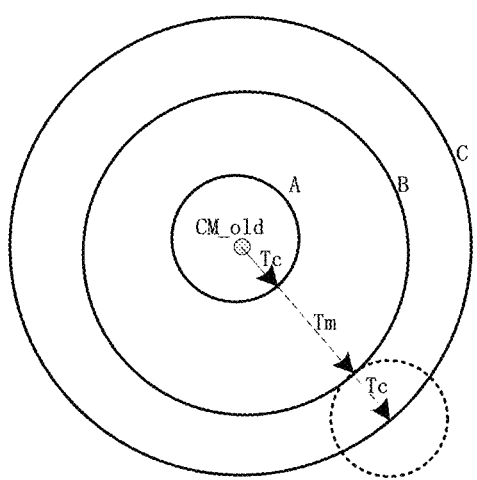

FAST QUERY METHOD FOR DYNAMIC LOCATION INFORMATION OF MOBILE NETWORK ENTITY

RELATED APPLICATION

This application claims priority to Chinese patent application No. 201711038593.0, filed with Chinese Patent Office on Oct. 30, 2017, entitled "Fast Query Method for Dynamic Location Information of Mobile Network Entity", which is incorporated herein by reference.

FIELD OF THE INVENTION

The present invention relates to the field of network technology and communication technology, and in particular, to a fast query method for dynamic location information of a mobile network entity.

BACKGROUND OF THE INVENTION

Mobility management technology involves management of mobile terminal location information, security, and service continuity, and is intended to achieve an optimal connection state between a terminal and a network, thereby providing guarantee for the application of various network services.

High-speed movement of the terminal may cause rapid changes of the IP addresses of an existing Internet system. Information-centric networking (ICN) has a core concept that the name is separated from the address, and adopts a naming mechanism of ICN, in which each entity in the network obtains a location-independent unique identifier of the entity as its name, and by dynamically binding the name of the entity and the current network address of the entity, the problem of rapid IP address changes during communication may be solved. The update and query of the mapping relationship between names and network addresses is an indispensable link in data communication, and its performance directly affects the quality of network services.

For flat naming, it has become a trend to implement name resolution for ICN by using a hierarchical structure. A flat resolution structure based on a hierarchical Bloom filter is proposed in the prior art. In this structure, a multi-level nested container space is constructed to facilitate system expansion, and the Bloom filter is used in each container to improve the look-up efficiency. However, in a mobile environment, when there is a change in location information, the maintenance management mechanism of an existing container or distributed hash structure cannot effectively support applications with high requirements on delay control and service continuity.

SUMMARY OF THE INVENTION

A technical problem to be solved by the present invention is: after a network entity (UE) at a mobile node in a communication session changes its current network address due to its movement, how to enable network equipment responsible for transmitting and forwarding its communication data to quickly find the current new address after its movement. New location information is obtained by a query within a controlled time limit to ensure a communication message can be forwarded to the new location in time so as to ensure the persistence of service sessions.

To achieve the aforementioned objective, the present invention proposes a fast query method for dynamic location information of a mobile network entity, the method using a hierarchical nested structure of distributed containers to process the registration and query of the location information of the network entity, the method including:

step 1) after the network entity moves and is connected to a network point of attachment and obtains a new network address allocated thereto, determining a level number of a registered container according to mobile service attribute parameters of the network entity, and then registering new location information of the network entity to the container of the corresponding level where the network entity is currently located, the location information at least comprising current network address information of the network entity; and step 2) when a network forwarding device learns that the network entity is currently unreachable, transmitting a query request for new location information of the network entity to a container where the network entity is located before movement; and after the container where the network entity is located before movement receives the query request, performing a look-up operation in the container and in a set of neighboring containers of the same level to obtain the new location information of the network entity.

As an improvement of the aforementioned method, before step 1), the method further includes:

maintaining, by each container in each level of the hierarchical nested structure of distributed containers, a set of neighboring containers of the same level through threshold screening of network communication ranging values between a management node of the container and management nodes of other containers of the same level, wherein the containers of the same level are containers having a same characteristic value Tc, the characteristic value Tc being an upper limit of a network communication delay between any two nodes in the container; and the containers have a nested relationship, that is, multiple i-level containers constitute an (i+1)-level container, wherein $1 \leq i \leq I-1$, where I represents the maximum number of layers of the nested container, and Tc (i)<Tc (i+1), where Tc (i) is a characteristic value of an i-level container, and Tc (i+1) is a characteristic value of an i+1-level container.

As an improvement of the aforementioned method, in step 1), the network point of attachment is a device responsible for allocating network addresses to network entities; content of the location registration information of the network entity comprises: the network entity's name, the network entity's mobile service attribute parameters, current valid location information, and release serial number, wherein the release serial number is maintained by the network entity and updated with each registration; the network entity's mobile service attribute parameters comprises the network entity's moving speed V, and an upper limit Ts of interruption time allowable for the current mobile service session; and the moving speed V is a speed nominal value corresponding to a fluctuation range of the actual moving speed, and the different speed nominal values represent different moving speed levels.

As an improvement of the aforementioned method, determining a level number of a registered container according to mobile service attribute parameters of the network entity in step 1) specifically includes:

step 101) based on current mobile service attribute parameters of the network entity, calculating an upper limit Tm of a network communication delay; and step 102) the aforementioned $T_m$ is compared with a characteristic value Tc (i) of each level of container; according to principles "Tc (i–1)<$T_m$/K≤Tc (i), and selecting i=I when Tc (I)<$T_m$/K, and selecting i=1 when $T_m$/K≤$Tc_1$", selecting i that meets the above principles as a container level that matches current mobile service attributes of the network entity, where K is a globally specified parameter whose value is equal to a tracking and query range and efficiency of location information of the network entity, and preferably, 1≤K≤4.

As an improvement of the aforementioned method, after step 1), the method further includes: updating and storing, by a container responsible for processing registration information, location information and release serial number of the network entity, and the container only stores and updates received network entity location information with an updated release serial number.

As an improvement of the foregoing method, step 2) specifically includes:

step 201) transmitting, by a network forwarding device, a query request for location information to a container $C_{i\_old}$ where the network entity is located before movement, content of the request comprising: the network entity's name, a movement tag, and a query waiting time limit, wherein the mobility tag is used to indicate that the location of the network entity may have changed and enhanced query processing that support mobility is requested;

step 202) after the container $C_{i\_old}$ receives the query request, looking up the location information of the network entity in the container, and also sending network entity location query requests to containers in a set of neighboring containers of the same level respectively, the requests carrying no mobility tag;

step 203) looking up, by each of the containers receiving the query requests, the location information of the network entity in the container, and if the information is found, returning the location information and release serial number of the network entity to the container $C_{i\_old}$; and step 204) screening, by the container $C_{i\_old}$, all the location information of the network entity received within a valid time limit, and selecting the location information of the network entity with the latest release serial number as a returned query response value.

As an improvement of the foregoing method, selection basis of the set of neighboring containers of the same level $\{C_{i\_m}\}$ is:

for an i-level container $C_{i\_j}$, each container in a set of neighboring containers of the same level should all be i-level containers, and a network communication delay t between any of management nodes of the containers and a management node of the container $C_{i\_j}$ should be less than a specified value T related to a characteristic value of the level of container; a minimum value of T is selected as (2+K) Tc (i); and after container construction is completed, each container node periodically updates information of the set of neighboring containers of the same level as the container $C_{i\_j}$ by measuring the network communication delay information with other container nodes of the same level.

The present invention has advantages as follows:

The present invention is directed to the requirement of communication session persistence, and discloses a fast query method for dynamic location information of a mobile network entity, so as to solve the problem of quickly reacquiring network location information of a mobile communication node when an entity at the communication node moves at different speed levels, thus meeting the service requirements of restoring communication and keeping sessions persistent.

BRIEF DESCRIPTION OF THE DRAWINGS

FIG. 1 is a schematic diagram of a relationship between UE location information and a container before and after movement.

DETAILED DESCRIPTION OF THE EMBODIMENTS

Now, the present invention is further described in conjunction with the accompanying drawings.

A hierarchical nested structure of distributed containers is used in the present invention for registration and query management of location information of a network entity (UE). When the UE changes its associated network point of attachment due to movement, regardless of the direction and range of the movement, it will eventually fall into a set of nested container. The key is how to select a container level where the location information is to be registered and published after the movement of the UE. A container level selection method is as follows:

Based on current mobile service attribute parameters of the UE, such as a moving speed V of the UE, an upper limit Ts of interruption time allowable for the current mobile service session, etc., an upper limit of a network communication delay $T_m$=f (V, Ts) between locations of the UE before and after movement is calculated, and matched with characteristic value parameters of the levels of container, and the aforementioned Tm is compared with a characteristic value Tc (i) of each level of container; according to principles "Tc (i−1)<$T_m$/K≤Tc (i), and selecting i=I when Tc (I)<$T_m$/K, and selecting i=1 when $T_m$/K≤$Tc_1$", where I represents the maximum number of levels of nested container, i that meets the above principles is selected as a container level that matches current mobile service attributes of the network entity, where K is a globally specified parameter whose value is equal to a tracking and query range and efficiency of location information of the network entity, and preferably, 1≤K≤4.

In addition, to avoid the change of a container level selection result caused by the change of the moving speed as far as possible, settings of a moving speed grade, a fluctuation range of the moving speed V and a corresponding speed nominal value may be optimized and adjusted according to the actual situation.

In actual implementation, the aforementioned container level selection method is also expanded to include the following ways:

(1) Multiple container levels including the aforementioned matched i are selected at the same time to register location information, for example, to i−1, i, and i+1 at the same time.

(2) Regardless of different mobile service attributes of different UEs, a fixed-level container or some specified container levels are select in a unified manner for location information registration; for example, the lowest-level container (i.e. i=1) is select in a unified manner.

(3) The UE carries other auxiliary parameters to select or predict the related container level i.

After the container level matched with the UE is determined, it needs to further determine the range of the container in which the UE currently located after its movement. As shown in FIG. 1, suppose:

(1) for a specified level i of container, the network communication delay between any two nodes is less than Tc (i);

(2) before movement of the UE, a network point of attachment associated therewith is POA_o, the i-layer container where the UE is located is C_old, and its container management node is CM_old; and (3) regardless of the moving direction and trajectory of the UE, after a period of time, after movement of the UE, an network point of attachment associated therewith is POA_n, an i-layer container where the UE is located is C_new, and its container management node is CM_new.

Then, using the container management node CM_old before movement as the center, three concentric circles A, B and C are formed, which respectively represent a maximum possible range of the UE location before movement, a maximum possible range of the UE location after movement, and a maximum possible range of the i-layer container management node where the UE is located after movement. The radius of the three concentric circles are Tc, Tm+Tc, and Tm+2Tc, respectively, where Tm is an upper limit of a network communication delay between locations of the UE before and after movement. Therefore, the value of Tm+2Tc represents a maximum network communication delay between the management nodes of the two i-layer containers where the UE is located before and after movement. A set range of the i-layer container where the UE may be located after movement can be delimited according to this value.

Regarding the registration and look-up of the UE location information in the container, an implementation example is as follows:

(1) After receiving a UE location information registration request, an underlying container determines a container level (denoted as i) matched thereto according to UE mobile service attribute parameters carried therein.

(2) The underlying container publishes the UE location registration information to an i-level container to which it belongs according to the nested structure of the container, and the i-level container is responsible for updating and storing the UE location information, and a release serial number, etc, and the i-level container only stores and updates received UE location information with an updated release serial number.

(3) The underlying container may save a corresponding relationship between the UE and the container level i matched therewith.

(4) When a network forwarding device on a communication data transmission path of the UE finds that the UE is unreachable, it may send a query request for location information of the UE to the underlying container where the UE is located before movement, and the underlying container forwards the aforementioned query request to the i-level container where the container is locate by using the previously stored corresponding relationship between the UE and the container level i matched therewith, and the i-level container looks up the location information of the UE.

Finally, it should be noted that the foregoing embodiments are only used for illustrating, rather than limiting, the technical solutions of the present invention. Although the present invention is described in detail with reference to the embodiments, those of ordinary skill in the art should understand that all modifications or equivalent substitutions made to the technical solutions of the present invention without departing from the spirit and scope of the technical solutions of the present invention should be encompassed within the scope of the claims of the present invention.

The invention claimed is:

1. A fast query method for dynamic location information of a mobile network entity, the method using a hierarchical nested structure of distributed containers to process a registration and a query of location information of the mobile network entity, the method comprising:

step 1) maintaining, by each container in each level of the hierarchical nested structure of distributed containers, a set of neighboring containers of the same level through threshold screening of network communication ranging values between a management node of the container and management nodes of other containers of the same level, wherein the containers of the same level are containers having a same characteristic value Tc, the characteristic value Tc being an upper limit of a network communication delay between any two nodes in the container; and the containers have a nested relationship such that multiple i-level containers constitute an (i+1)-level container, wherein $1 \leq i \leq I-1$, where I represents the maximum number of layers of the nested containers, and Tc (i)<Tc (i+1), where Tc (i) is a characteristic value of an i-level container, and Tc (i+1) is a characteristic value of an (i+1)-level container;

step 2) after the mobile network entity is connected to a network point of attachment after movement and obtains a new network address assignment, determining a level number of a registered container according to mobile service attribute parameters of the mobile network entity, and then registering new location information of the mobile network entity to the container of the corresponding level where the mobile network entity is currently located, the location information at least comprising current network address information of the mobile network entity; and step 3) when a network forwarding device learns that the mobile network entity is currently unreachable, transmitting a query request for new location information of the mobile network entity to a container where the mobile network entity was located before movement; and after the container where the mobile network entity was located before movement receives the query request, performing a look-up operation in the container and in the set of neighboring containers of the same level to obtain the new location information of the mobile network entity, wherein in step 2), the network point of attachment is a device responsible for allocating network addresses to network entities; content of the new location information of the mobile network entity comprises: a name of the mobile network entity, mobile service attribute parameters of the mobile network entity, current valid location information, and a release serial number, wherein the release serial number is maintained by the mobile network entity and updated with each registration; the mobile service attribute parameters of the mobile network entity comprise a moving speed V of the mobile network entity, and an upper limit Ts of interruption time allowable for the current mobile service session; and the moving speed V is a speed nominal value corresponding to a fluctuation range of the actual moving speed, and the different speed nominal values represent different moving speed levels.

2. The fast query method for dynamic location information of the mobile network entity according to claim 1, wherein the determining of the level number of the registered container according to the mobile service attribute parameters of the mobile network entity in step 2) specifically comprises:

step 201) based on current mobile service attribute parameters of the mobile network entity, calculating an upper limit $T_m$ of the network communication delay; and step 202) the upper limit $T_m$ is compared with a characteristic value Tc (i) of each level of container; according to principles "Tc (i−1)<$T_m$/K≤Tc (i), and selecting i=I when Tc (I)<$T_m$/K, and selecting i=1 when $T_m$/K≤Tc$_1$", selecting i that meets the above principles as a container level that matches current mobile service attributes of the mobile network entity, where K is a globally specified parameter having a value equal to a tracking and query range and efficiency of location information of the mobile network entity.

3. The fast query method for dynamic location information of the mobile network entity according to claim 2, wherein step 3) specifically comprises:

step 301) transmitting, by a network forwarding device, a query request for location information to a container $C_{i\_old}$ where the mobile network entity was located before movement, content of the request comprising: the name of the mobile network entity, a mobility tag, and a query waiting time limit, wherein the mobility tag is used to indicate that a location of the mobile network entity may have changed and enhanced query processing that support mobility is requested;

step 302) after the container $C_{i\_old}$ receives the query request, looking up the location information of the mobile network entity in the container, and also sending network entity location query requests to containers in a set of neighboring containers of the same level respectively, the requests carrying no mobility tag;

step 303) looking up, by each of the containers receiving the query requests, the location information of the mobile network entity in the container, and if the location information is found, returning the location information and the release serial number of the mobile network entity to the container $C_{i\_old}$; and step 304) screening, by the container $C_{i\_old}$, all the location information of the mobile network entity received within a valid time limit, and selecting the location information of the mobile network entity with the latest release serial number as a returned query response value.

4. The fast query method for dynamic location information of the mobile network entity according to claim 2, wherein a selection basis of the set of neighboring containers of the same level $\{C_{i\_m}\}$ is:

for an i-level container $C_{i\_j}$, each container in a set of neighboring containers of the same level are all i-level containers, and a network communication delay t between any of the management nodes of the containers and a management node of the container $C_{i\_j}$ is less than a specified value T related to a characteristic value of the level of container; a minimum value of T is selected as (2+K) Tc (i); and after container construction is completed, each container node periodically updates information of the set of neighboring containers of the same level as the container $C_{i\_j}$ by measuring the network communication delay information with other container nodes of the same level.

5. The fast query method for dynamic location information of the mobile network entity according to claim 2, wherein after step 2), the method further comprises: updating and storing, by a container responsible for processing registration information, the location information and the release serial number of the mobile network entity, and the container only stores and updates received network entity location information with an updated release serial number.

6. The fast query method for dynamic location information of the mobile network entity according to claim 1, wherein after step 2), the method further comprises:

updating and storing, by a container responsible for processing registration information, the location information and the release serial number of the mobile network entity, and the container only stores and updates received network entity location information with an updated release serial number.

7. The fast query method for dynamic location information of the mobile network entity according to claim 3, wherein the determining of the level number of the registered container according to the mobile service attribute parameters of the mobile network entity in step 2) specifically comprises:

step 201) based on current mobile service attribute parameters of the mobile network entity, calculating an upper limit $T_m$ of a network communication delay; and step 202) the aforementioned $T_m$ is compared with a characteristic value Tc (i) of each level of container; according to principles "Tc (i−1)<$T_m$/K≤Tc (i), and selecting i=I when Tc (I)<$T_m$/K, and selecting i=1 when $T_m$/K≤Tc$_1$", selecting i that meets the above principles as a container level that matches current mobile service attributes of the mobile network entity, where K is a globally specified parameter whose value is equal to a tracking and query range and efficiency of location information of the mobile network entity, and 1≤K≤4.

* * * * *